United States Patent [19]

Congleton

[11] Patent Number: 4,880,081
[45] Date of Patent: Nov. 14, 1989

[54] OIL TANK CATWALK ASSEMBLY FOR AUTOMOTIVE SERVICE FACILITY

[76] Inventor: Stephen R. Congleton, 10179 Colonial Industrial Dr., South Lyon, Mich. 48178

[21] Appl. No.: 271,862

[22] Filed: Nov. 16, 1988

[51] Int. Cl.⁴ .......................... F16C 3/14; F16H 33/00
[52] U.S. Cl. .................................... 184/1.5; 220/1 C; 52/180
[58] Field of Search ........................ 184/1.5; 220/1 C; 52/180

[56] References Cited

U.S. PATENT DOCUMENTS 1,337,408  4/1920  Morris .................................. 184/1.5
1,651,616  12/1927  Morrison ............................. 184/1.5

OTHER PUBLICATIONS

Catalog/Manual No. 125, Bustin Steel Products, Inc., P.O. Box 589, Dover, N.J. 07801, p. 45.

Primary Examiner—Carroll B. Dority
Attorney, Agent, or Firm—Remy J. VanOphem

[57] ABSTRACT

An automotive servicing facility that includes an oil storage tank removably disposed in the lower portion of a vehicle service pit. A catwalk is mounted on the oil storage tank to provide a walk-on surface for a mechanic working in the pit, e.g. to change the crankcase oil, grease the wheel bearings, etc. One tank may store oil and/or sludge drained from vehicles incident to oil changing operations, while a second separate tank may store fresh new oil to be delivered to the vehicle.

21 Claims, 1 Drawing Sheet

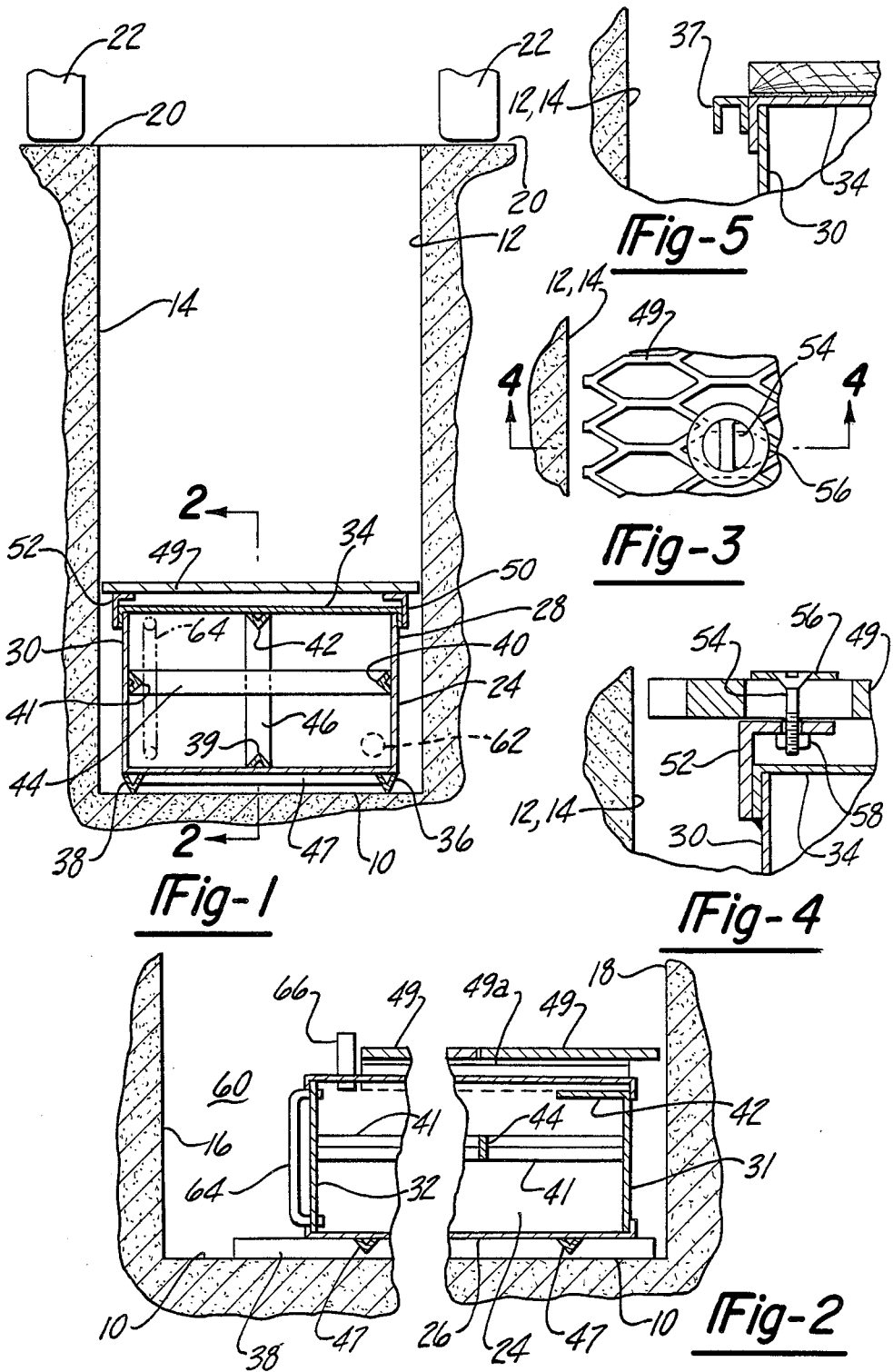

OIL TANK CATWALK ASSEMBLY FOR AUTOMOTIVE SERVICE FACILITY

BACKGROUND OF THE INVENTION

1. Field of the Invention

This invention relates to automotive service facilities, especially service facilities for rapidly servicing a vehicle, i.e., removing dirty oil and replacing it with new clean oil. Other related operations may be performed on the automotive vehicle, e.g. replacing the oil filter and dispensing grease to wheel bearings.

2. Description of the Prior Art

Conventional automotive service facilities sometimes include pit structures sunk into a cement floor of the facility to a depth of several feet. The vehicle is driven to a point where the vehicle crankcase is directly over a central area of the pit. A mechanic standing in the pit is able to gain access to the crankcase drain plug for draining oil into a funnel structure suitably supported within the pit. The pit is usually an elongated rectangular cavity having a length on the order of eighteen feet and a width on the order of three to four feet. The mechanic can walk back and forth in the pit to inspect the vehicle undersurface and perform the necessary work on the vehicle components.

In known vehicle service pit structures, the dirty oil removed from the vehicle is discharged into a large underground storage tank located beneath the pit structure or in the ground alongside the pit structure. The underground location of the storage tank requires that the ground be dug up to either install the tank or remove the tank; great expense is involved in the necessary escavating operations to build such facility. Also, if the underground tank should leak oil the leaking condition will go undetected, with possible contamination of the ground water. Additionally, an underground tank is exposed to moisture that can prematurely corrode the tank wall and shorten its service life. If it becomes necessary to remove sludge from an underground oil storage tank the pump-out operation can prove troublesome and difficult. Noted herebelow are examples of prior art applications that utilize underground oil storage tanks.

U.S. Pat. No. 4,352,322 to Brauer discloses an underground oil collection tank having an upwardly extending pipe-type connection to a sloped wall formed at the bottom of a pit structure defined by side walls and end walls. A platform overlies the sloped wall; the mechanic can move back and forth on the platform while servicing the automobile. One disadvantage of the Brauer arrangement is the fact that the tank is underground. Digging is required to install or remove the tank.

U.S. Pat. No. 4,284,173 to Patterson shows an underground oil storage tank disposed beyond the ends of pit structures; a flexible tube extends from the tank to a longitudinally movable container. The mechanic can position the container beneath the crankcase area of an automobile or trunk to receive oil for drainage into the tank. A vertically adjustable platform is positioned in each pit structure to enable the mechanic to move back and forth while servicing the overhead vehicle. One possible disadvantage of the Patterson arrangement is the fact that the pit structure is built into the building; each installation includes beams, columns, etc., that must be assembled (connected) on site. Installation time and expense would be relatively high.

U.S. Pat. No. 1,949,394 to Martin is somewhat similar to the Brauer and Patterson patents, in that the Martin patent teaches an underground oil storage tank located below a pit structure. The pit structure is composed of a number of sheet metal sections and connector bars that apparently are connected together at the job site to form the completed installation.

U.S. Pat. No. 1,654,073 to Fagan shows a one piece sheet metal pit structure having side walls and end walls. An oil collection funnel is connected to a separate underground oil storage tank via a jointed pipe structure. Oil accumulating in the bottom of the pit structure can be discharged to the sewer via a drain pipe.

The patented arrangements are similar to one another in that in each case the oil storage tank is located underground. The present invention has a different arrangement wherein the oil storage tank is located in the pit structure and provides an elevated structure usable by the person working on the vehicle for servicing the vehicle.

SUMMARY OF THE INVENTION

The invention contemplates a vehicle servicing arrangement wherein an elongated rectangular oil storage tank is removably disposed in the lower portion of a cement pit structure. A horizontal catwalk is mounted above the oil storage tank to provide a walk-on platform for a mechanic working in the pit. The storage tank is built as a unit off site, i.e., in a factory setting with the usual facilities for collecting drained oil from a vehicle.

Installation of the storage tank into the pit structure is easily accomplished by lowering the tank structure into the pit using a chain lift and/or manually with block and tackle. If necessary, the storage tank can be lifted out of the pit, e.g. if a leak develops in the tank or if it is desired to use the tank in another installation.

The catwalk is preferably sectionalized into wood sections and loosely placed or glued to the top of the tank structure in any convenient manner. Alternatively, the catwalk sections may be made from a foraminous material which is sectionalized into a number of separated sections that are individually detachably connected to the storage tank (i.e., to the tank upper face). The catwalk sections may be removed from the tank structure for cleaning or repair, or for clean out of the zones along the tank side surfaces.

BRIEF DESCRIPTION OF THE DRAWINGS

FIG. 1 is a sectional view taken through a structural arrangement embodying the invention;

FIG. 2 is a broken away sectional view taken along lines 2—2 in FIG. 1;

FIG. 3 is a fragmentary enlarged top plan view of a catwalk structure used in the FIG. 1 arrangement;

FIG. 4 is a fragmentary sectional view taken along lines 4—4 in FIG. 3; and

FIG. 5 is a fragmentary sectional view of a catwalk structure according to an alternate structure.

DETAILED DESCRIPTION OF THE PREFERRED EMBODIMENT

FIGS. 1 and 2 illustrate one form that the invention can take. The illustrated apparatus includes a storage tank catwalk assembly removably disposed in a cement pit structure. The pit structure consists of a bottom wall 10, two side walls 12 and 14, and two ends walls 16 and 18. The two side walls are contemplated to be a predetermined width depending upon the width of the vehicle to be serviced (usually approximately 3 feet wide), whereas the two end walls are widely spaced, e.g. on the order of eighteen feet apart or as required. The defined pit is an elongated rectangular pit structure oriented to underlie a vehicle after the vehicle has been driven to a predetermined location on the floor 20 of the service facility. Two of the vehicle wheels are shown at 22 in FIG. 1.

FIG. 2 is a broken away view of the storage tank walkway assembly, showing end areas of the assembly; intermediate sections of the assembly are omitted so that structural details are scaled up to be visible. An oil storage tank 24 is shown resting on the pit bottom wall 10. The tank includes a sheet metal bottom wall 26, side walls 28 and 30, end walls 31 and 32, and a top wall 34. Certain ones of the walls may be flanged to facilitate welding operations at the seams (joints) where the various walls meet.

The oil storage tank 24 further includes two parallel longitudinal skid bars, shown as channels 36 and 38. The channels are spot welded to the bottom wall 26 at various points therealong to provide longitudinal reinforcements. As best illustrated in FIG. 2, end portions of the skid bars may extend beyond the tank end walls 31 and 32; the exposed end of the bars 36 and 38 may be connected to cables or other lift devices used to lower the oil storage tank 24 into the pit structure or to lift the tank out of the pit structure. In the alternative, lugs 37 may be spot welded to both sides of the oil storage tank 24 at conveniently spaced locations such that a chain lift (not shown) may be used to lift the tank from the pit structure. In such embodiment the channels 36 and 38 would not extend beyond the tank end walls 31 and 32.

The oil storage tank 24 is designed to provide a storage reservoir for dirty oil taken from the serviced vehicles. The weight of the stored oil imposes an outward load on the tank walls. The walls may be reinforced against outward bulging forces by longitudinal tie bars 39, 40, 41 and 42; these bars extend the full length of the associated walls 26, 28, 30, 32 and 34 and the number of longitudinal tie bars required is determined by the size of the tank as well as the load of the stored oil imposed on the side walls and bottom. Spot welding may be used to connect the bars to the tank walls.

Tie bars 44 extend transversely between the bars 40 and 41 to constrain the side walls 28 and 30 against outward bulging motions. The drawings shows one bar 44; however, any number of such bars may be used at spaced points along the length of the reinforcement longitudinal tie bars 40 and 41. Additional tie bars 46 can be extended transversely between the longitudinal tie bars 39 and 42. The ends of the additional tie bars are welded to respective longitudinal tie bars 39, 40, 41 and 42 or to the tank side walls as required.

The tank bottom wall 26 may be reinforced against transverse downward bulge deformation by means of transversely extending reinforcement bars 47; any number of such bars, spaced along the length of the tank, may be used. The various reinforcement mechanisms are intended to maintain the tank structure configuration against deformation or leakage while enabling relatively thin gage sheet metal to be used for the various tank walls, thereby minimizing overall weight and material costs.

Overlying the oil storage tank 24 is a sectionalized catwalk structure 49. In the embodiment of FIGS. 3 and 4, support rails 50 and 52 are welded to upper side areas of the tank to form connection points for the catwalk structure. Sectionalization of the catwalk into a reasonable number of sections, e.g. six sections, reduces the weight of each catwalk section, permitting the individual sections to be removed from the support rails 50 and 52 when it is desired to paint or clean the catwalk sections, or when it becomes necessary to remove debris from the area alongside the oil storage tank 24. Each catwalk section extends the full width dimension of the pit structure, i.e., across the space between the pit side walls 12 and 14. Assuming a total catwalk length of sixteen feet and six catwalk sections, each section would have a length dimension of approximately 2⅔ feet.

Each catwalk section is preferably formed of a plywood material, as shown for example in FIG. 5. A foraminous material may also be contemplated to enable oil, sludge or other debris to gravitate through the openings in the catwalk upper surface. Any oil spillage will be absorbed by the plywood while any type of foraminous surface would also satisfy this objective. The aim is to keep the catwalk surface reasonably clean and slip-free. The fastener mechanisms for connecting the catwalk sections to the support rails 50 and 52 as shown in FIGS. 3 and 4 may be varied as to detail. As shown in FIGS. 3 and 4, a representative fastener mechanism includes a bolt or screw 54 extending through a washer 56 into mesh with a nut 58 welded onto the undersurface of the support rail 52. Four such bolt/nut assemblies may be used to detachably fasten each catwalk section to the support rails 50 and 52, two fasteners for each rail. The plywood material shown in FIG. 5 may be secured thereto using any conveniently available glue intended for such purpose.

It will be seen from FIGS. 1, 3 and 4 that edge areas of the catwalk are relatively close to the pit side walls 12 and 14; the catwalk is substantially coextensive with the pit width dimension such that the mechanic is not likely to have his foot catch in any crack or joint at the pit side wall surface.

The end edge areas of the catwalk sections are in near adjacency to one another, as shown at 49a in FIG. 2, whereby the catwalk sections collectively define an unobstructed continuous walk-on surface along the length dimension of the pit. The catwalk sections will rather closely conform to the pit side wall spacing; however, the catwalk assembly should not prevent initial installation of the oil storage tank 24 into the pit if the catwalk sections are mounted to the tank after the tank is in its installed position.

It will be seen from FIG. 2 that the tank end wall 32 is spaced some distance away from the pit end wall 16, e.g. on the order of two feet. This space provides a clearance 60 at one end of the tank structure that facilitates human access to drain opening or pipe 62 extending from the tank end wall 32. The drain opening 62 is not visible in FIG. 2, but is shown in phantom in FIG. 1. A motor operated pump, not shown may be connected to the drain opening 62 when it is desired to pump oil and/or sludge out of the tank without lifting the tank out of the pit.

It is desirable to have some indication of the liquid level in the tank. A liquid level gage (sight glass) 64 may be attached to the tank end wall 32 for viewing by a person standing or kneeling in the clearance space 60. Oil in initially drained into the oil storage tank 24 through a pipe 66 that extends upwardly from the tank top wall 34 in proximity to the end wall 32. A funnel structure, not illustrated, may be connected to the pipe 66 via a flexible hose, whereby oil is drained from the vehicle crankcase into the funnel and eventually into the oil storage tank 24. The tank may also be provided with a vent pipe near the end wall 32; the vent pipe is not visible in the drawings.

The clearance space 60 enables the mechanic to reach or observe various mechanism, including the aforementioned drain opening 62, sight glass 64, and oil intake pipe 66. All of these mechanisms are arranged at one end of the oil storage tank 24, leaving the entire upper surface of the tank free of obstructions that would interfere with placement or use of the catwalk sections. The sectionalized catwalk provides a flat planar walk-on surface that is free of any projections or gaps that could be a safety hazard.

From a description of the embodiment set forth herein, it is recognized that the invention also contemplates using the storage tank structure for the storage of new oil so that a motor operated pump, not shown, connected to the drain openings may be used when it is desired to pump fresh new oil into the crankcase after the spent used oil has been removed therefrom into a separate tank to complete servicing of the vehicle.

Having thus described the present invention by way of an exemplary embodiment, it will be apparent to those skilled in the art that many modifications may be made from the exemplary embodiment without departing from the spirit of the present invention or the scope of the claims appended thereto.

What is claimed is:

1. In association with a motor vehicle servicing pit structure that includes an elongated bottom wall, two upstanding widely spaced end walls defining the length dimension of the pit structure, and two closely spaced upstanding side walls defining the width dimension of the pit structure, the improvement comprising:
    an oil storage tank structure adapted to rest on said pit structure elongated bottom wall; said oil storage tank structure having width and length dimensions less than corresponding dimensions of said pit structure, whereby said oil storage tank structure can be removably installed in said pit structure by lowering said oil storage tank structure into said pit structure; and
    a catwalk overlying said oil storage tank structure to provide a walk-on platform for a mechanic who is to service an overhead vehicle.

2. The improvement as claimed in claim 1 wherein said catwalk comprises a series of separate catwalk sections individually detachably connected to the underlying tank structure.

3. The improvement as claimed in claim 2 wherein each side separate catwalk section has a width dimension only slightly less than the width dimension of said pit structure, such that said walk-on platform is substantially coextensive with said pit structure width dimension.

4. The improvement as claimed in claim 3 wherein said separate catwalk section has end edge areas thereof in near adjacency to one another, whereby said separate catwalk sections collectively define an unobstructed continuous walk-on surface along said length dimension of said pit structure.

5. The improvement as claimed in claim 3 wherein said oil storage tank structure includes two spaced parallel rails extending along said length dimension of said oil storage tank structure to supportably engage each said separate catwalk section.

6. The improvement as claimed in claim 5 further comprising fastener mechanisms extendable through each of said catwalk sections into said two spaced parallel rails to detachably connect said catwalk to said oil storage tank structure.

7. The improvement as claimed in claim 3 wherein each said catwalk section is foraminous.

8. The improvement as claimed in claim 1 wherein said oil storage tank structure comprises two spaced parallel skid bars attached to the undersurface of said tank structure along the undersurface of said oil storage tank structure in said length dimension to rest on said bottom wall of said pit structure.

9. The improvement as claimed in claim 8 wherein said two spaced parallel skid bars extend beyond the ends of said oil storage tank structure to form lift connection points.

10. The improvement as claimed in claim 1 wherein said length dimension of said oil storage tank structure is substantially less than the corresponding dimension of said pit structure so as to provide a free space at one end of said oil storage tank structure.

11. The improvement as claimed in claim 10 further comprising a drain opening in said one end of said oil storage tank structure accessible from said free space.

12. The improvement as claimed in claim 11 further comprising a level gage at said one end of said oil storage tank structure accessible from said free space.

13. The improvement as claimed in claim 12 further comprising a funnel connection pipe on said oil storage tank structure adjacent said one end of said oil storage tank structure.

14. The improvement as claimed in claim 1 wherein said oil storage tank structure comprises a bottom wall, two upstanding side walls, and a top wall.

15. The improvement as claimed in claim 14 further comprising tie means extending within said oil storage tank structure between said two upstanding side walls to constrain said side walls against outward bulging under loads imposed by oil within said oil storage tank structure.

16. The improvement as claimed in claim 15 wherein said tie means comprises a series of longitudinally spaced bars extending between said two upstanding side walls of said oil storage tank structure.

17. The improvement as claimed in claim 14 further comprising at least two longitudinally extending reinforcement bars extending along two upstanding side walls of said oil storage tank structure at an intermediate point between said oil storage tank structure bottom wall and said top wall.

18. The improvement as claimed in claim 7 further comprising a series of longitudinally spaced tie bars extending transversely between said two longitudinally extending reinforcement bars to constrain two upstanding side walls of said oil storage tank structure against outward bulging under loads imposed by oil within said oil storage tank structure.

19. In association with a motor vehicle servicing pit structure that includes an elongated bottom wall, two widely spaced end walls defining said length dimension of said pit structure, and two closely spaced side walls defining said width dimension of said pit structure, the improvement comprising:
    a rectangular oil storage tank structure adapted to rest on said pit structure elongated bottom wall; said oil storage tank structure having width and length dimensions less than corresponding width and length dimensions of said pit structure, whereby said oil storage tank structure can be removably installed in said pit structure by lowering said tank structure into said pit structure; and a catwalk overlying said oil storage tank structure to provide a walk-on platform for a mechanic who is to service an overhead vehicle; said rectangular oil storage tank structure comprising a bottom wall, two upstanding side walls, two upstanding end walls, and a top wall; said oil storage tank structure further comprising two spaced parallel skid bars extending along said bottom wall of said oil storage tank structure in said length dimension of said oil storage tank structure; said oil storage tank structure further including two spaced parallel rails extending along said top wall of said oil storage tank structure in said length dimension of said oil storage tank structure; and said catwalk comprises a series of separate catwalk sections individually detachably connected to said two spaced parallel rails to form a walk-on surface that is substantially coextensive with said width dimension of said pit structure.

20. The improvement of claim 19 wherein said length dimension of said oil storage tank structure is sufficiently less than the corresponding dimension of said pit structure so as to provide a free access space at one end of said oil storage tank structure.

21. The improvement of claim 20 further comprising a drain opening in said one end of said oil storage tank structure accessible through said free space; and a funnel connection pipe on said oil storage tank structure adjacent said free space.

* * * * *

UNITED STATES PATENT AND TRADEMARK OFFICE
CERTIFICATE OF CORRECTION

PATENT NO. : 4,880,081
DATED : November 14, 1989
INVENTOR(S) : Stephen R. Congleton It is certified that error appears in the above-identified patent and that said Letters Patent is hereby corrected as shown below:

Column 4, line 65, delete "in" and insert ---- is ----.

Column 5, line 7, delete "mechanism" and insert ---- mechanisms ----.

Column 6, line 52, delete "7" and insert ---- 17 ----.

Column 8, line 1, delete "saidoil" and insert ---- said oil ----.

Signed and Sealed this

Ninth Day of April, 1991

Attest:

HARRY F. MANBECK, JR.

*Attesting Officer*

*Commissioner of Patents and Trademarks*